United States Patent [19]

Rosenthal

[11] Patent Number: 5,528,673
[45] Date of Patent: Jun. 18, 1996

[54] SWITCHING DEVICE FOR CONTROLLING POWER TO APPLIANCES AND MUTING AUDIO DEVICES IN RESPONSE TO A TELEPHONE CALL

[76] Inventor: Richard A. Rosenthal, P.O. Box 329, Fawnskin, Calif. 92333

[21] Appl. No.: 323,378

[22] Filed: Oct. 14, 1994

[51] Int. Cl.⁶ .................................................. H04M 11/00
[52] U.S. Cl. .................................. 379/102; 379/104
[58] Field of Search ............................ 379/373, 375, 379/377, 378, 110, 102, 104, 105, 395, 387, 90

[56] References Cited

U.S. PATENT DOCUMENTS

| | | | |
|---|---|---|---|
| 4,243,973 | 1/1981 | Sandidge | 340/148 |
| 4,425,477 | 1/1984 | Magil | 179/2 B |
| 4,438,527 | 3/1984 | Hammond | 381/107 |
| 4,442,319 | 4/1984 | Treidl | 179/2 A |
| 4,626,848 | 12/1986 | Ehlers | 340/825.69 |
| 4,805,206 | 2/1989 | Beom-Chae | 379/77 |
| 4,807,052 | 2/1989 | Amano | 358/194.1 |
| 4,885,579 | 12/1989 | Sandbank | 379/102 |
| 5,128,987 | 7/1992 | McDonough et al. | 340/825.72 |
| 5,233,646 | 8/1993 | Kuromi | 379/102 |
| 5,251,253 | 10/1993 | Chutuk | 379/104 |

FOREIGN PATENT DOCUMENTS

3113127  10/1982  Germany ............................. 379/387

*Primary Examiner*—Wing F. Chan
*Attorney, Agent, or Firm*—Walter A. Hackler

[57] ABSTRACT

A switching device for simultaneously controlling AC power to an electrical appliance and providing an infrared mute and unmute signal to an infrared-controlled device in response to initiation and termination of a telephone call includes a circuit for connecting said switching device to a telephone line, having tip-and-ring connectors, and a telephone; an AC plug for connecting said switching device to an AC outlet; an AC power-controlled outlet for receiving electrical appliance plugs. An infrared-controlled circuit is provided for decoding an existing infrared emitting device and for emitting an infrared signal suitable for muting the infrared controlled device; and a control circuit is provided for simultaneously controlling power to said AC power-controlled outlet and causing said infrared circuit to emit the infrared signal. The control circuit is responsive to voltage across the tip-and-ring connectors and interconnected between the AC power plug, the AC power-controlled outlet and the infrared circuit.

1 Claim, 7 Drawing Sheets

SWITCHING DEVICE FOR CONTROLLING POWER TO APPLIANCES AND MUTING AUDIO DEVICES IN RESPONSE TO A TELEPHONE CALL

The present invention generally relates to switching apparatus for controlling AC power to one or more electrical appliances and is more particularly to a switching device for turning AC power on and off to electrical appliances, such as television sets, radios, fans, dishwashers or any sound-emanating appliance, in response to incoming telephone calls to the area under the sound influence of the subject appliance, as well as simultaneously muting of infrared controlled devices such as television sets and compact disc (CD) players. Of particular concern for most households is the audio conflict between a television set and an incoming telephone call. This problem, of course, has been addressed many times in the past which has resulted in a great number of elaborate and complicated systems for either muting the audio portion of the television set or attenuating the audio level of a television set or stereo when a nearby telephone is in use.

A sampling of the art directed to solving this problem includes U.S. Pat. Nos. 4,243,973 to Sandidge; 4,425,477 to Magil; 4,438,527 to Hammond; 4,442,319 to Treidl; 4,626, 848 to Ehlers; 4,805,206 to Beom-Chae; 4,807,052 to Amano; 4,885,579 to Sandbank; 5,128,987 to McDonough et al.; and 5,251,253 to Chutuk.

Many of the hereinabove-referenced patents discuss the simplicity of operation and low cost of production. A close examination of the fields of each of the patents indicate they contain sophisticated electronics including amplifiers, sensors, attenuators transistors, circuit boards and the like in order to accomplish either the attenuation of the audio signal from the appliance without turning the appliance off, or the control of power to the appliance. It should be evident upon review of the prior art developed in this area and a search of commercially available-devices that, while the elaborate configurations of these devices may function to achieve their accomplished purpose, they nonetheless fall short of providing a viable commercial product.

The present invention is directed to a switching device for controlling AC power to an electrical appliance which is commercially viable in view of its use of only readily available inexpensive Triacs, transistors, and integrated circuits; and the exclusion of any relays whatsoever.

SUMMARY OF THE INVENTION

A switching device in accordance with the present invention generally for simultaneously controlling AC power to an electrical appliance and providing infrared mute signal to an infrared control device in response to initiation and termination of a telephone call generally includes means for connecting the switching device to a telephone line, the latter having tip and ring connectors, and a telephone.

AC plug means are provided for connecting the switching device to an AC outlet, and one or more AC power control outlet means provide a means for receiving electrical appliance plugs.

An infrared circuit provides means for decoding an existing infrared-emitting device and for emitting an infrared signal suitable for muting the infrared control device. Control means are provided for simultaneously controlling power to the AC power control outlet and causing the infrared circuit means to emit the infrared signal. A control means accordingly is responsive to the voltage across the tip-and-ring connector and interconnected between the AC power plug means, the AC power control outlet means, and the infrared circuit apparatus.

In an alternative embodiment of the present invention, the infrared circuit means is configured for controlling the emission of an infrared signal from a universal remote control.

More particularly, the control means, in accordance with the present invention, is configured for turning off power to the AC power control outlet means and causing the infrared circuit means to emit the infrared signals when the voltage across the tip-and-ring connector corresponds to the ringing of a telephone connected across the tip-and-ring connectors and subsequent off-hook status of the telephone. In addition, the control means may be configured for turning on power to the AC power control outlet means and causing the infrared circuit means to emit the infra-red signal when the voltage across the tip-and-ring connectors corresponds to a hang-up of the telephone.

In addition, the infrared circuit means may be configured for decoding a plurality of existing infrared-emitting devices and for emitting a plurality of infrared signals, each suitable for muting a different infrared current control device.

BRIEF DESCRIPTION OF THE DRAWINGS

The advantages and features of the present invention will be better understood by consideration of the following detailed description, particularly in conjunction with the accompanying drawings in which.

DETAILED DESCRIPTION

Figure 1:
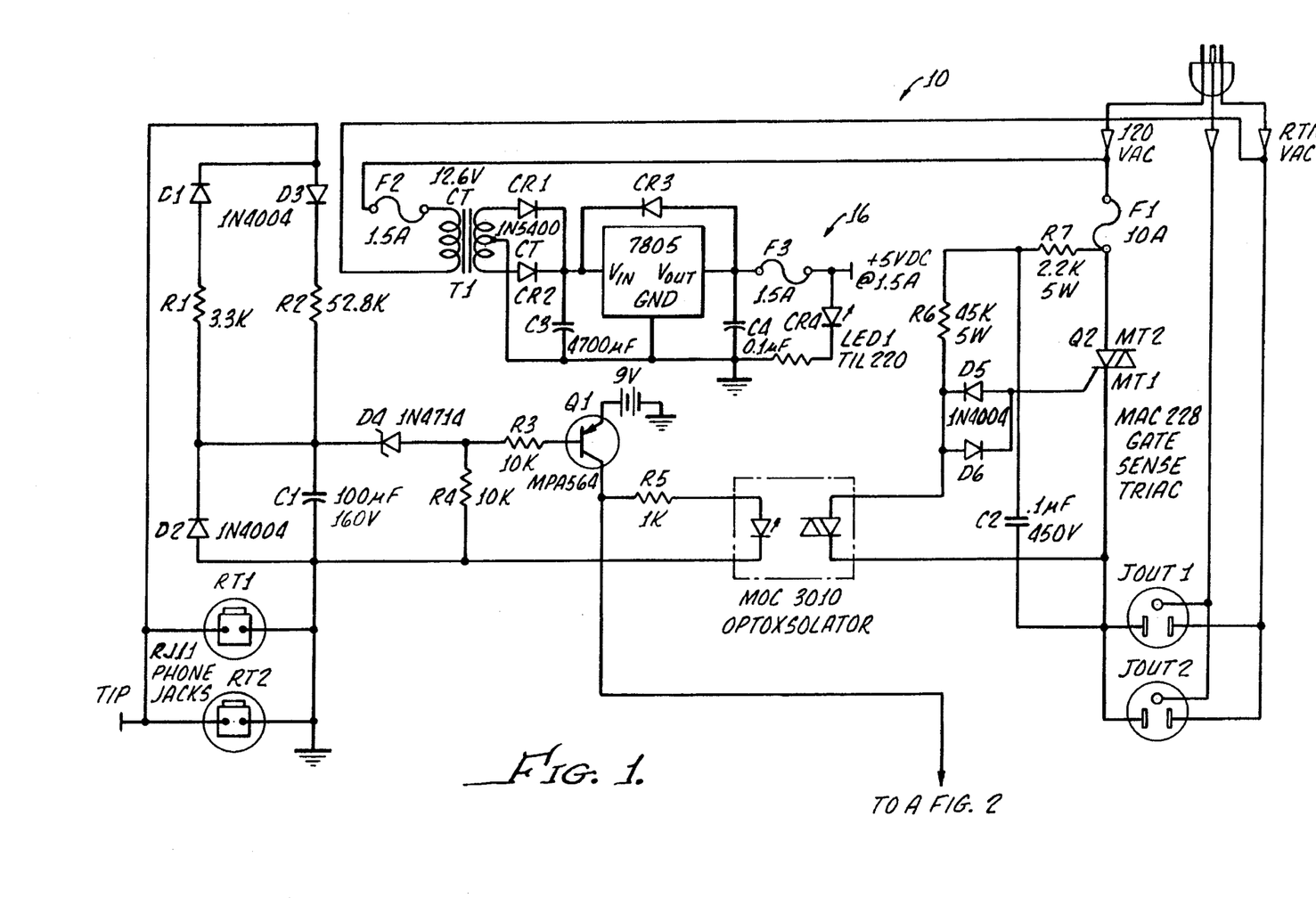
FIG. 1 is a schematic diagram of a telephone line sense-and-control circuit, in accordance with the present invention.
Figure 2:
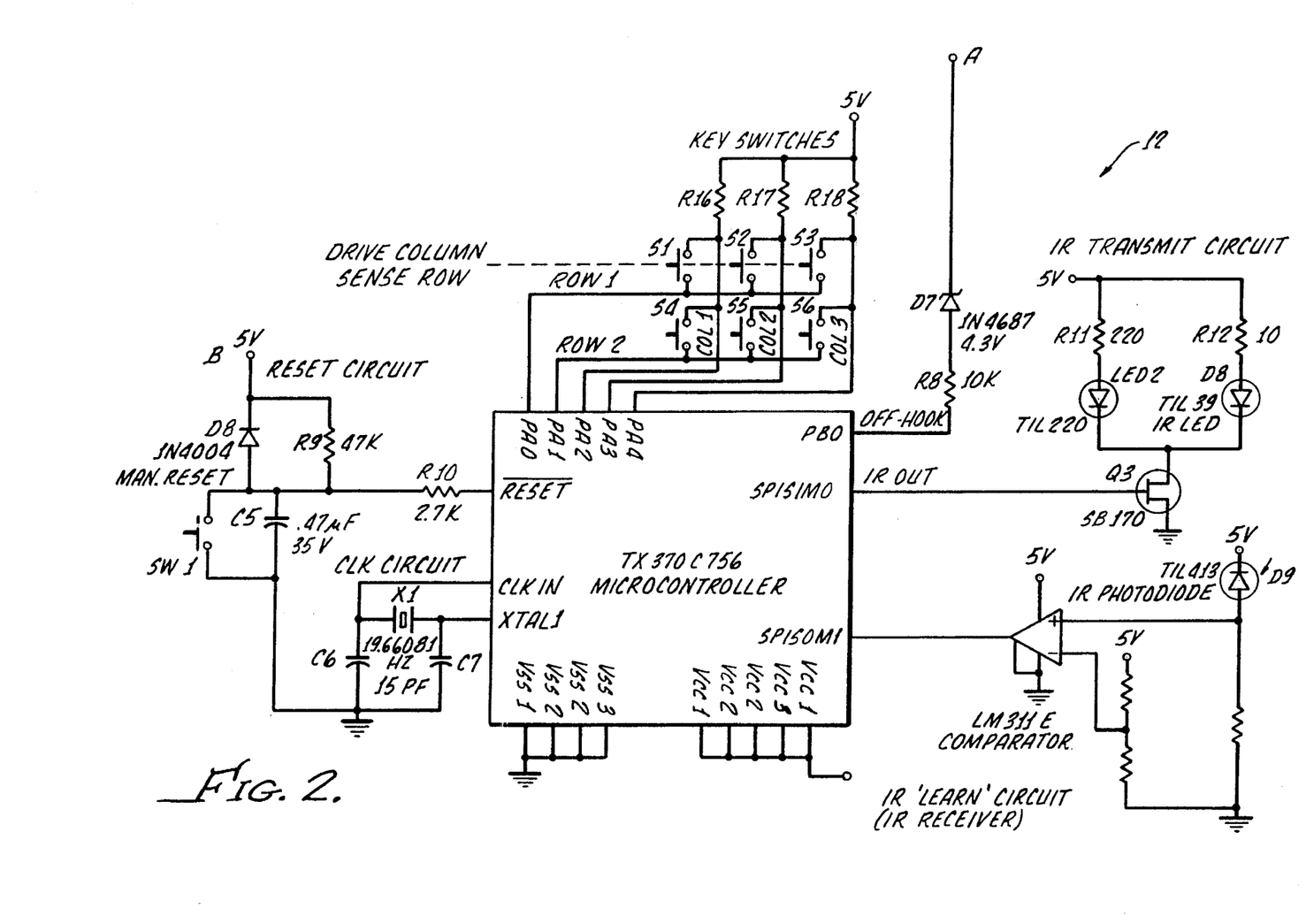
FIG. 2 is a schematic diagram of infrared learning/output circuit, in accordance with the present invention, for decoding infrared signals and emitting of the same.

Turning now to FIGS. 1 and 2, there is shown, in schematic form, a switching device which includes a control circuit 10 (FIG. 1) and an infrared circuit 12 (FIG. 2) for controlling AC power to one or more electrical appliances (not shown) as well as simultaneously emitting infrared mute signals, all response to initiation and termination of a telephone call.

It should be appreciated that all components shown in the figures of the present application are representative of conventional electronic devices and accordingly designated by type and characteristics, i.e., voltage, capacitance, resistance, etc., in the schematic diagrams. Therefore, for the sake of clarity, repetition of the specific devices, and their identification and operating characteristics are not called out in the present specification.

The hereinabove noted patents are representative of previous approaches which utilize telephonic sensor and control means to trigger "electromechanically" latched relay(s) which are used to hold a circuit in an "on" or "off" state condition. These systems are expensive and afford moderate reliability attributable to the performance of the electromechanical relay(s).

The present invention differs from other telephonic line-triggered circuits—such as Magil's U.S. Pat. No. 4,425,477, Sandidge's U.S. Pat. No. 4,243,973, and others-insofar as the electrical appliances to be muted or controlled are plugged directly into the present invention without the need for an external wiring by the user to either the AC appliance(s) to be controlled or any audio subsystems (speakers) that may be attached to such appliances.

The circuitry of the present invention differs markedly from other similar devices insofar as a "gate sensitive" Triac is used in place of electromechanical relays to control the "on/off" characteristics of any selected AC appliances attached to Telephone Alert.

This is accomplished by holding the gate of the Triac in the "on" state condition by incorporating two back-to-back diodes that effectively utilize the positive and negative half cycles of the AC current.

When the phone is rung, or the handset is in the off-hook condition, an optoisolator shorts the gate current on the Triac, thereby inhibiting AC current flow to the attached AC appliances plugged into Telephone Alert, which are now subsequently held in the "off" state condition.

McDonough's Pat. No. 5,126,987 teaches utilizing a telephonic sensor and control means to trigger an infrared remote controller to mute a television equipped with an infrared receiver. This embodiment utilizes a mechanically programmed DIP switch or a numeric keypad to preprogram a specific code (IR carrier signal) which corresponds to a particular television set and which is output to an IR emitter logic circuit which, in turn, outputs this signal upon the initial ring of a telephone, or whenever an "off-hook" condition is present on the phone line. To restore volume after the phone call is terminated and an "on-hook" condition is present on the line, the user must manually disable the detection circuitry by using a manually operated toggle switch to restore the volume on the television set.

The present invention differs markedly from earlier teachings insofar as:

1. It is designed to be utilized with any manufacturer's IR remote controller, to which a user can input his/her specific code for a particular TV, VCR, stereo system or CD player. This is accomplished by interfacing the row (output) and column (input) signal paths from the microprocessor on board the user's IR remote controller for the "mute"control button on the IR remote controller to the logic, circuitry of the present invention Telephone Alert, as hereinafter described.

2. Up to four codes may be utilized to selectively or simultaneously mute the volume on a user's TV, VCR, stereo system or CD player upon the initial ring of a telephone or whenever an "off-hook" condition is present on the phone line.

3. Volume is automatically restored to these devices eight seconds after the call is terminated and the handset is returned to the cradle of the telephone set.

4. IR devices may be engaged and disengaged simultaneously with other AC appliances attached to the present invention.

5. The present invention incorporates an IR circuit "learning circuit" which is activated whenever a user enters the "learn" mode of operation and depresses the "mute" control button on his/her IR remote controller and points the unit directly into the IR lens of the present invention. This code is then subsequently output upon the initial ring of a telephone, or whenever an "off-hook" condition is initially present, and when the "on-hook" condition is first sensed upon the termination of a telephone call, with the volume restored eight seconds later, as previously described herein.

Turning now to FIGS. 1 to 10, the switching device, in accordance with the present invention, will be described in terms of the function of the conventional elements used therein.

When a telephone line is connected to either of the phone jacks RJ1 or RJ2, a corresponding 48 VDC is supplied across the tip-and-ring conductors. This voltage is dropped to 15 VDC by D4 and the "tip:ring" load current is dropped to 1.5 µA by R4. R3 limits the current to the base of Q1 which holds the transistor in the "off" state by back-biasing the junction; holding the base of Q1 at a higher potential (15 VDC) than the emitter (9 VDC). R5 limits the operating current supplied to the LED emitter on board U1 to 10 mA which is held in the "off" state condition by Q1.

AC power is supplied to JOUT1 and JOUT2 via a 10 amp pico fuse used for safety protection. AC power is held in the "on" state condition by limiting the current to the gate of Q2 to 3 mA by R6. D5 rectifies the positive half-cycle of the AC power holding the gate of Q2 in the "on" state condition while D4 maintains the gate "on" during the negative half-cycle of the AC cycle thereby permitting AC current flow through Q2 to JOUT1 and JOUT2. R7 and C2 provide a snubber network that provides compensation for inductive loads.

When the telephone rings, a corresponding 90 VAC is supplied across the tip-and-ring conductors. This voltage is rectified on the positive half cycle by D3; a charge delay of approximately ten seconds to C1 is initiated by R2; simultaneously, D1 rectifies the negative half-cycle and the "ring" voltage is discharged by a delay of 0.5 second by R1 through D2 and grounded at the cathode of C1 to the "ring" conductor, thereby discharging the "ring" voltage through this RC network.

The base voltage on Q1 now significantly drops below 9 VDC, switching Q1 to the "on" state condition enabling current to flow from the 9-volt battery to the emitter of Q1 on through the collector to R5, which limits the current from BT to 10 mA which, in turn, triggers the LED on board U1 to the "on" state condition.

The gate voltage holding Q2 in the "on" state condition via R6, D4 and D5 is now shorted through the output driver of U1 via R7. Subsequently, Q2 switches to the "off" state condition, and AC power to JOUT1 and JOUT2 is terminated.

When the call is answered and a handset (not shown) is lifted from a cradle (not shown), the telephone reverts to the "off-hook" condition. A positive potential of 8 VDC now exists across the tip-and-ring conductors maintaining Q1 and U1 in the "on" state condition, and Q2 in the "off" state condition, which, in turn, continues to inhibit AC power to JOUT1 and JOUT2.

If the telephone is not answered and the caller hangs up, or the handset is returned to the cradle, the voltage potential supplied across the tip-and-ring conductors now reverts to 48 VDC. The base voltage on Q1 now becomes higher than the voltage supplied by BT on the emitter. The transistor switches to the "off" state condition which, in turn, switches U1 to the "off" state condition, thereby restoring power to the
gate of Q2, which in turn switches to the "on" state condition, restoring AC power to JOUT1 and JOUT2.

Figure 5:
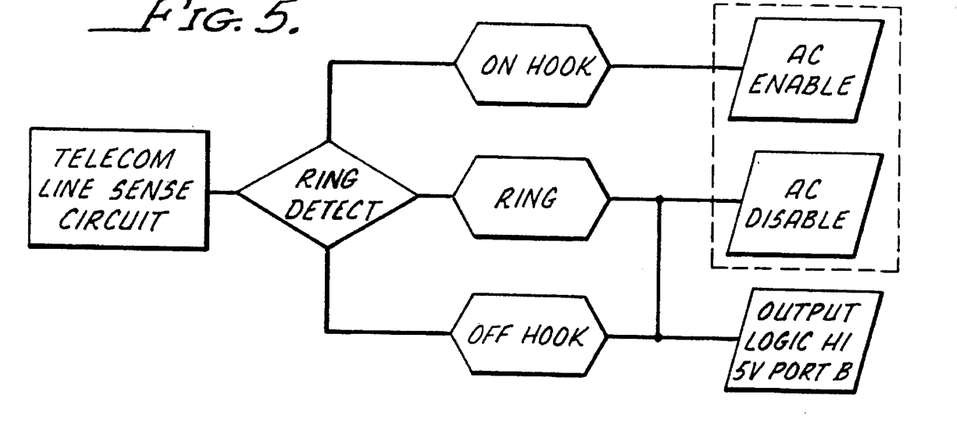
FIG. 5 is a block diagram of the telecommunication's logic, in. accordance with the present invention.
Figure 6:
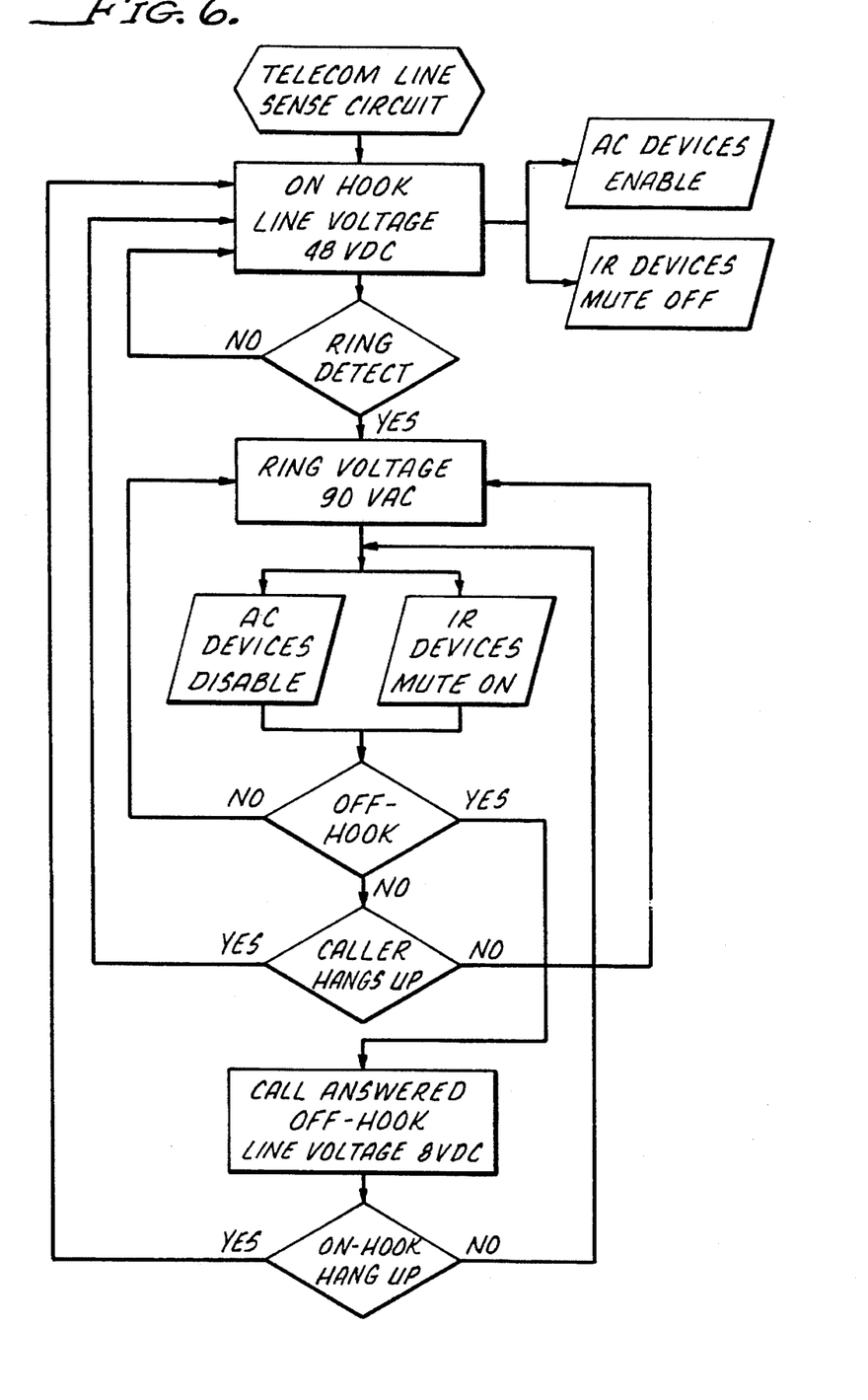
FIG. 6 is a block diagram of telecommunication's sense logic, in accordance with the present invention.

FIGS. 5 and 6 graphically depict this sequence of events.

Figures 7, 8:
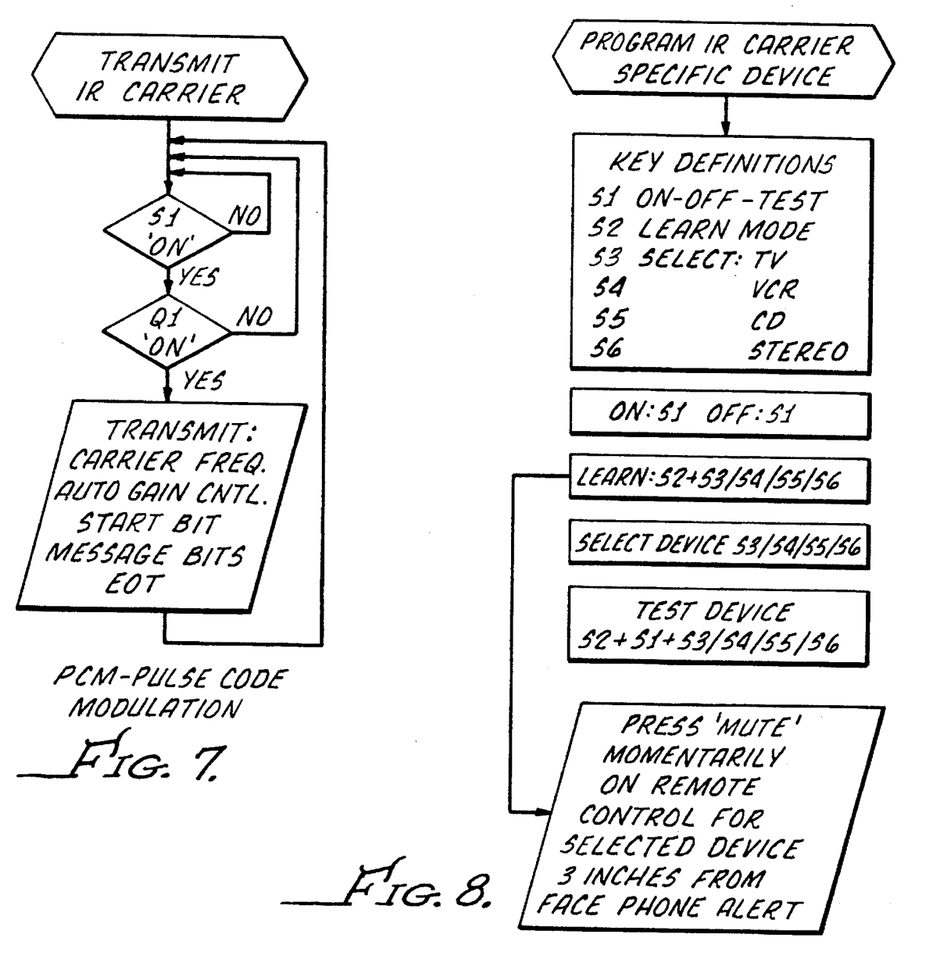
FIG. 7 is a block diagram of transmit logic in accordance with the present invention.
FIG. 8 is a block diagram of program logic in accordance with the present invention.

A preselected IR device-such as a television, CD player, VCR or stereo system-is muted when Q1 goes to the "on" state condition when the receiver is "off-hook" (FIG. 1) D7 reduces the output on the collector of Q1 to 5 VDC and R8 limits the current of this signal as it is input to PB0 on Port B (FIGS. 1 and 2). This signal initiates a software routine resident in EPROM on U3 (FIGS. 2, 4) which, in turn, outputs a "learned" preprogrammed IR signal resident in RAM on U3 (FIG. 4) via the serial peripheral interface output pin (SPISIMO) on U3 which, in turn, modulates D8 (FIG. 2) at the correct IR carrier frequency, duty cycle, bit period and hexadecimal code 30 (message bits) for the "mute" function of the particular device selected. The IR receiver on the preselected device decodes the IR signal and "mute" is engaged. Q3 (FIG. 2) powers the IR LED D8 and visible LED 2, which provides a visible indicator whenever an IR signal is transmitted to an IR receiver on a preselected device. FIG. 7 graphically depicts this sequence of events.

Figure 4:
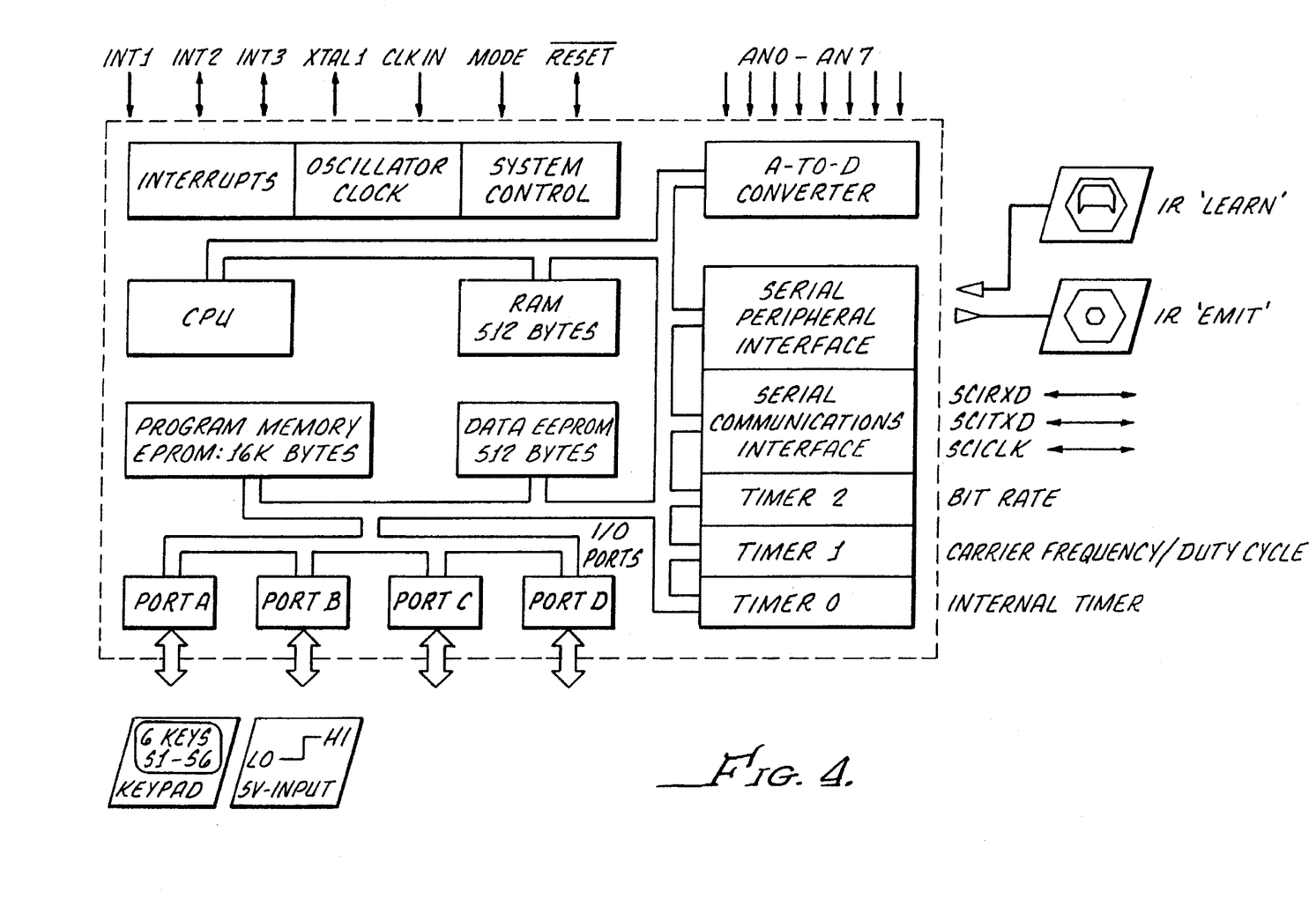
FIG. 4 is a block diagram of system architecture for the microcontroller shown in FIG. 2.
Figure 9:
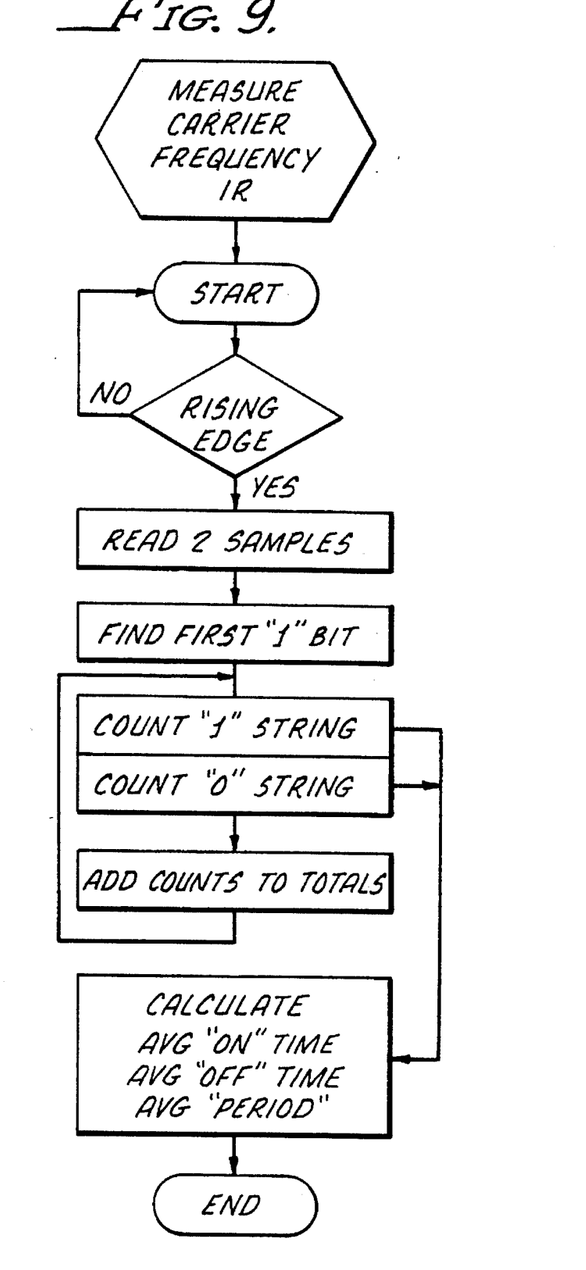
FIG. 9 is a block diagram of procedure for determination of carrier frequency in accordance with the present invention.
Figure 10:
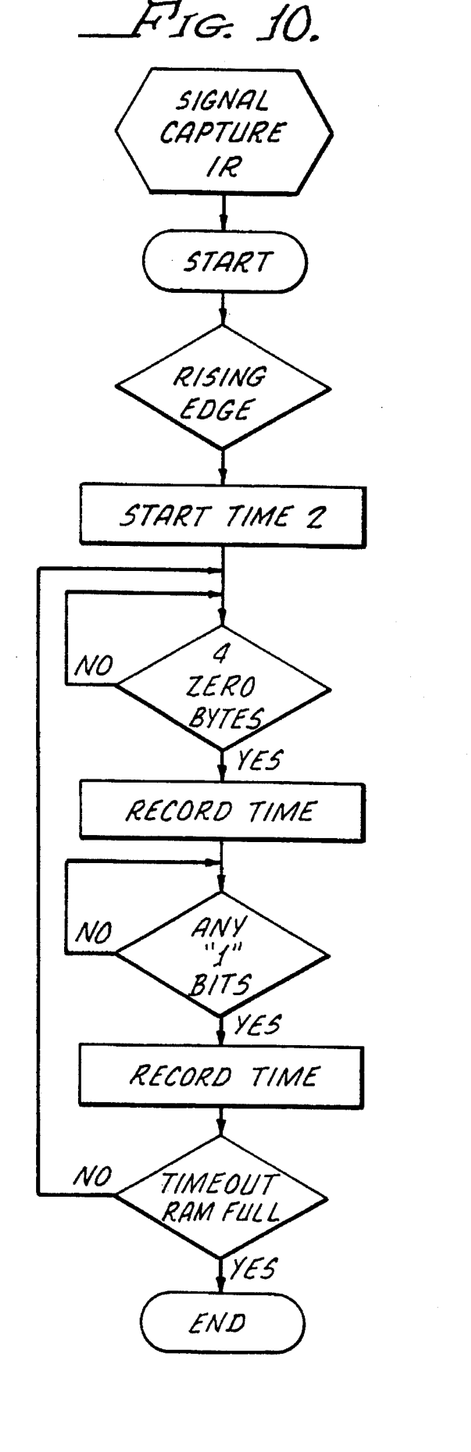
FIG. 10 is a block diagram of signal capture logic in accordance with the present invention.

An IR signal for the "mute" function on a user-selected remote controller is learned by Phone Alert when the user selects the "learn" mode of operation (FIGS. 2 and 8). The IR photodiode D9 receives the incoming signal where it is converted to a TTL level signal by U4 and input into the serial peripheral communications buffer via the SPISIMO pin on U3 (FIGS. 2 and 4). The signal processing is accomplished at an internal clock rate of approximately 20 MHz. FIGS. 9 and 10 graphically depict the software logic for determination of IR carrier frequency and signal capture to reproduce the "mute" function on Phone Alert.

Figure 3:
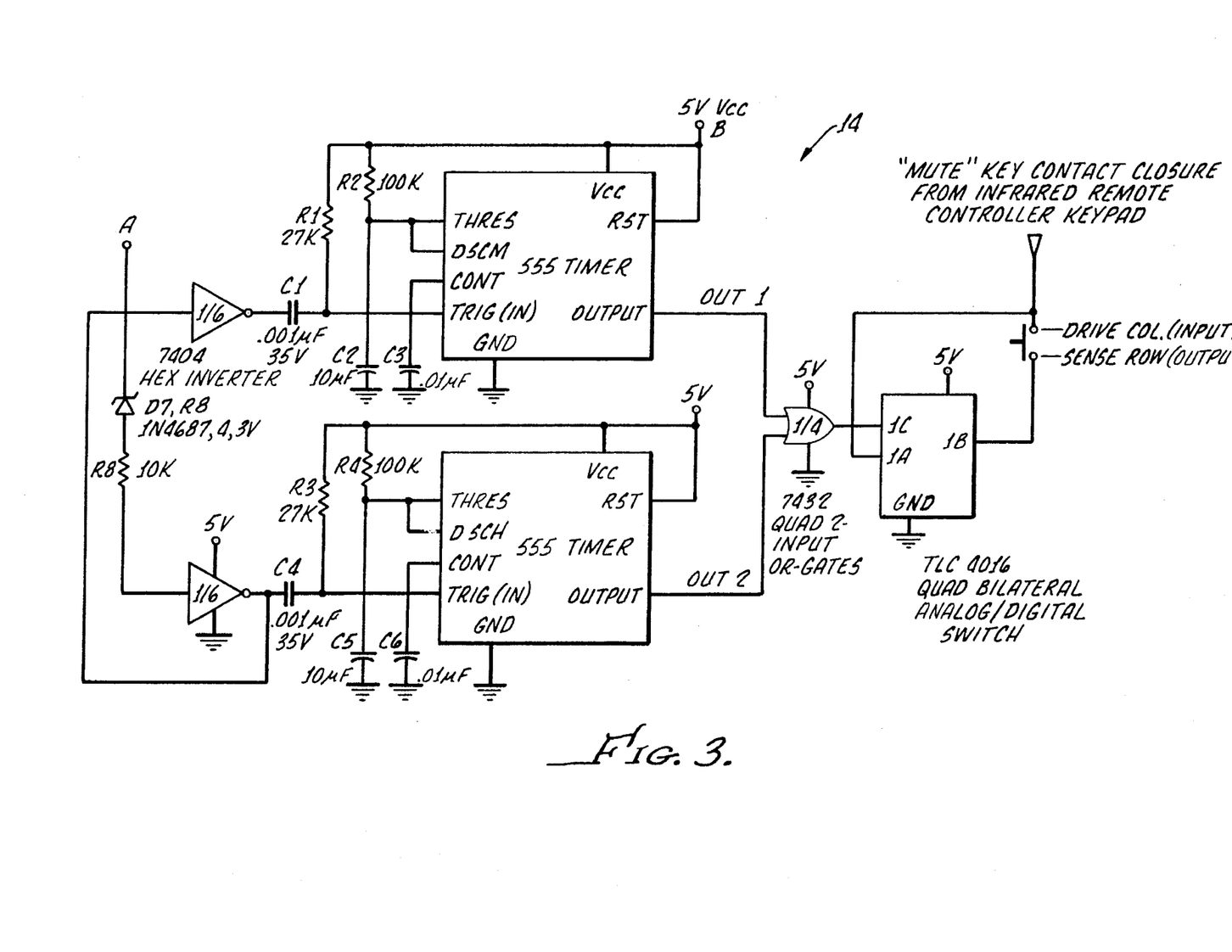
FIG. 3 is a schematic diagram of an alternative embodiment of infrared circuitry useful for adapting the control circuit shown in FIG. 1 for controlling a universal infrared controller.

An alternative embodiment for an infrared circuit 14 which may utilize preprogrammed signal carriers found on any one of a number of universal remote controllers is depicted in FIG. 3. When a "ring" or "off-hook" condition is present (FIG. 1), there is a 9-volt output present on the collector of Q1 as previously described. The signal is regulated to 4.7 volts at 0.4 mA by D7 and R8.

This signal is then inverted by U1 to provide an AC-coupled input pulse via C1 and C4 to the trigger inputs on U2 and U3. An AC time constant of 1.1 seconds is provided respectively by R2, C2, and R4, C5 on U2 and U3. This provides a pulsed output on OUT1 and OUT2 of which is gated by U4 to provide a logic level "HI" input to U5 which shorts the row and column key switch for the "mute" function key on the user's universal remote controller whenever a "ring" or "off-hook" condition is present and whenever a transition to the "on-hook" condition is initiated by the user.

Power for the present invention is derived from a 9-volt battery which is used to power U1 (FIG. 1). U3 a signal output to U3 (FIG. 3) or U1 (FIG. 1). U3 and all other peripheral circuitry is powered by a regulated 5 VDC 1.5 amps power supply circuit 16 shown in FIG. 2.

Although there has been hereinabove described a switching device in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A switching device for simultaneously controlling AC power to an electrical appliance and providing an infrared mute signal to an infrared-controlled device in response to initiation and termination of a telephone call, said switching device comprising:

means for connecting said switching device to a telephone line, having tip-and-ring connectors, and a telephone;

AC plug means for connecting said switching device to an AC outlet;

AC power-controlled outlet means for receiving electrical appliance plugs;

infrared circuit means for decoding an existing infrared emitting device and for emitting an infrared signal suitable for muting the infrared-controlled device, said infrared circuit means being configured for decoding a plurality of existing infrared-emitting devices and for emitting a plurality of infrared signals, each suitable for muting a different infrared-controlled device; and control means for simultaneously controlling power to said AC power-controlled outlet means and causing said infrared circuit means to emit the infrared signal, said control means being responsive to voltage across the tip-and-ring connectors and interconnected between said AC power plug means, said AC power-controlled outlet means, and said infrared circuit means, said control means comprising:

Triac means, having a sensitive gate controlling ON and OFF states of the Triac means, for controlling power to said power-controlled outlet means, the ON state corresponding to providing power to said power-controlled outlet means and the OFF state corresponding to cutting power to said power-controlled outlet means;

diode means, interconnected with said means for connecting said switching device to a telephone line, and said Triac means, for holding the Triac means in the OFF state in response to 90 V voltage applied across the tip-and-ring connectors and holding the Triac means in the ON state in response to 48 V voltage applied across the tip-and-ring connectors; and delay current means for delaying the emission of the infrared signal by the infrared current means after a voltage across the tip-and-ring connector corresponding to a hang-up of the telephone.

* * * * *